Aug. 24, 1948. O. C. WALLEY 2,447,675
REVERSIBLE SINGLE-PHASE MOTOR
Filed Feb. 24, 1947
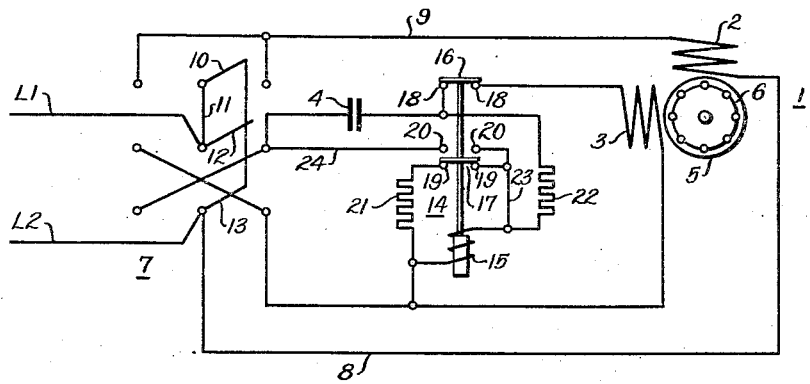
INVENTOR
Omar C. Walley.

Patented Aug. 24, 1948

2,447,675

UNITED STATES PATENT OFFICE 2,447,675

REVERSIBLE SINGLE-PHASE MOTOR

Omar C. Walley, Lima, Ohio, assignor to Westinghouse Electric Corporation, East Pittsburgh, Pa., a corporation of Pennsylvania Application February 24, 1947, Serial No. 730,312

10 Claims. (Cl. 318—207)

1

The present invention relates to reversible, single-phase, induction motors and, more particularly, to a single-phase, capacitor-start motor which can be plugged, or rapidly reversed while running.

Single-phase induction motors of usual construction have a main, or running, primary winding and an auxiliary, or starting, primary winding, which are physically displaced from each other on the stator of the motor and which carry currents which are displaced in phase, the phase displacement of the currents being produced, in the capacitor-start type of motor, by a capacitor connected in series with the auxiliary winding. In starting such a motor, both windings are energized from a single-phase line, and when the motor has accelerated to a sufficiently high speed, the auxiliary winding is disconnected by a centrifugal switch, and the motor runs on the main winding alone.

There are many applications of single-phase motors in which it is necessary, or desirable to instantaneously reverse the motor while it is running. This can not be done, however, with a motor of the conventional construction just described, since the auxiliary winding is disconnected while the motor is running, and in order to reverse such a motor, it is necessary to disconnect it from the line and wait until it has slowed down to a low enough speed for the centrifugal switch to reclose before the motor can be reconnected to the line with the winding connections reversed. Various arrangements have been proposed for plugging, or rapidly reversing, single-phase motors of this type. These arrangements have usually involved the use of a relay for reconnecting the auxiliary winding to the line for reversing, and they have also required the use of the conventional centrifugal switch for interrupting the auxiliary winding circuit when the motor comes up to speed in either direction. Thus, these prior schemes for plug reversing single-phase motors have substantially increased the cost of the motor by the addition of the relay, and have increased the number of parts which must be provided. The use of a centrifugal switch also involves certain difficulties in maintaining proper end play of the rotor to obtain satisfactory operation of the switch.

The principal object of the present invention is to provide a single-phase induction motor, of the capacitor-start type, which can be plugged, or rapidly reversed while running, and which utilizes relatively few parts and is cheaper and easier to manufacture than previous types of reversible, single-phase motors.

Another object of the invention is to provide a reversible, single-phase, capacitor-start motor which utilizes a simple and inexpensive relay, of more or less standard construction, and which does not require the use of a centrifugal switch.

A further object of the invention is to provide a reversible, single-phase, capacitor-start motor in which an alternating-current voltage relay is used to control the circuit of the auxiliary winding, and in which fluttering of the relay, which is usually an objectionable characteristic of alternating-current relays, is prevented by rapidly increasing the voltage across the operating coil of the relay as soon as the relay starts to operate.

Other objects and advantages of the invention will be apparent from the following detailed description, taken in connection with the accompanying drawing, the single figure of which is a schematic diagram showing a preferred embodiment of the invention.

The drawing shows a reversible, single-phase, induction motor 1 of the capacitor-start type. The motor 1 has a main primary winding 2 and an auxiliary primary winding 3, which are physically displaced from each other on the stator of the motor, preferably by 90 electrical degrees, as indicated diagrammatically in the drawing. The necessary phase displacement between the currents in the main and auxiliary windings 2 and 3 is produced by means of a capacitor 4, which is connected in series with the auxiliary winding 3 during starting. The motor 1 also has a rotor member 5, which may be of any suitable type, and which carries a squirrel-cage secondary winding 6.

The main winding 2 and auxiliary winding 3 are energized from a single-phase supply line L1, L2 by means of a switch 7, which is shown as a three-pole, double-throw switch, and which functions as a combined line switch and reversing switch. One end of the main winding 2 is connected directly to one side of the supply line by a conductor 8, and the other end of the main winding 2 is connected by a conductor 9 to both upper stationary contacts of the switch 7 so as to be connected to the upper blade 10 of the switch 7 in either closed position of the switch. The upper blade 10 of the switch 7 is connected to the other side of the supply line by a conductor 11, so that the main winding 2 is connected across the line L1, L2, in the same direction, in either operating position of the switch 7.

The auxiliary winding 3 is connected to the line L1, L2 by means of the two lower blades 12 and 13 of the switch 7, which function as a reversing switch, to reverse the connection of the auxiliary winding to the line, as clearly indicated in the drawing. The circuit of the auxiliary winding 3 is controlled by means of a voltage relay 14, which has an operating coil 15 and two movable contacts 16 and 17. The contact 16 bridges stationary contacts 18 when the relay 14 is in its deenergized, or non-actuated, position shown in the drawing. The relay contact 17 bridges fixed contacts 19 when the relay is in the non-actuated position, and bridges fixed contacts 20 when the relay moves to actuated position. The relay contact 17 is preferably arranged so that it breaks the circuit at the contacts 19 substantially instantaneously when the relay starts to move, and preferably before the contact 16 interrupts its circuit. A resistor 21 is connected across the relay coil 15 through the fixed contacts 19, so that it is disconnected from the coil 15 when the relay is in actuated position. A second resistor 22 is connected between one end of the relay coil 15 and one of the fixed contacts 18, the other contact 18 being connected to one end of the auxiliary winding 3. The other end of the auxiliary winding 3 is connected to the other end of the relay coil 15 and to the switch 7. The capacitor 4 is connected between the stationary contacts 18 and the switch 7.

When the motor 1 is at rest, the relay 14 is deenergized and is in its non-actuated position shown in the drawing. To start the motor in either direction of rotation, the switch 7 is closed to one side or the other. When the switch 7 is closed to the right, for example, the main winding 2 is connected directly across the line through the conductor 8, and through the conductor 9 and switch blade 10. One end of the auxiliary winding 3 is connected to the line through the blade 13 of the switch 7, and the other end of the auxiliary winding is connected to the line through the stationary contacts 18 and relay contact 16, the capacitor 4, and the switch blade 12. Thus both the main and auxiliary windings are energized and the motor starts to rotate.

It will be observed that the relay coil 15, in series with the resistor 22, is connected across the auxiliary winding 3 through the relay contact 16, at this time, so that the coil 15 is responsive to the voltage across the auxiliary winding. In a capacitor-start motor, the voltage across the auxiliary winding increases as the motor accelerates so that this voltage can be utilized as an indication of the motor speed. The relay 14 is adjusted to pick up and move to actuated position when the voltage across the auxiliary winding 3 reaches a predetermined value, corresponding to a desired speed, which may, for example, be from 70% to 80% of synchronous speed. When this voltage is reached, the relay moves to actuated position and opens the contact 16, interrupting the auxiliary winding circuit, so that the motor continues to run on the main winding 2 alone. When the relay is in actuated position, the contact 17 bridges the fixed contacts 20 and connects the relay coil 15 directly across the line L1, L2 through the conductors 23 and 24, and the switch blade 12. Thus, the line voltage is utilized to hold the relay 14 in actuated position after the circuit of the auxiliary winding 3 is interrupted.

One disadvantage which has previously existed is the use of alternating-current relays has been the tendency of such relays to flutter, or rapidly open and close their contacts, just before positive operation of the relay. This effect is prevented from occurring in the arrangement of the present invention by means of the resistors 21 and 22. It will be noted from the drawing that when the relay 14 is in non-actuated position, the resistor 21 is connected in parallel with the coil 15 by the relay contact 17, and that the resistor 22 is in series with the parallel-connected coil 15 and resistor 21. When the voltage across the auxiliary winding 3 reaches the value at which operation of the relay is desired, the relay contact 17 opens substantially instantaneously, and preferably slightly before the contact 16 opens, as mentioned above. As soon as the contact 17 opens, the resistor 21 is disconnected from the relay coil 15, and the impedance relations in the series circuit comprising the coil 15 and resistor 22 are altered in such a manner that the voltage drop across the resistor 22 decreases and the voltage drop across the coil 15 increases. Thus, as soon as the relay 14 starts to operate, the voltage across the operating coil 15 is substantially immediately increased, giving the effect of a voltage surge applied to the coil, and causing the relay to operate positively and instantaneously with, in effect, a snap action. In this way, any tendency of the relay to flutter is eliminated, and rapid and positive action is obtained.

When the relay contact 17 bridges the fixed contacts 20, it connects the relay coil 15 to the supply line L1, L2 through the switch 7, as described above. When the contacts 20 are bridged, the resistor 22 is also connected directly across the capacitor 4, through the conductors 23 and 24, thus short-circuiting the capacitor through the resistor 22. In this way, the capacitor 4 is discharged through the resistor 22. This is another important feature of the invention, since if the capacitor 4 were not short-circuited, there would be a tendency for the relay 14 to have a pumping action, due to the capacitor discharging through the relay coil 15. By short-circuiting the capacitor through the resistor 22, this tendency is prevented and satisfactory operation is assured. Thus, in the operation of the relay 14, the contact 16 serves to interrupt the auxiliary winding circuit at the predetermined speed, and the contact 17 serves to connect the relay coil across the line voltage to maintain the relay in actuated position, and also effects a rapid increase in voltage on the coil to prevent flutter of the relay, and short-circuits the capacitor 4.

When the motor is running in either direction, with the relay held in its actuated position by the line voltage, as described above, the motor 1 can be plugged, or rapidly reversed, merely by throwing the switch 7 to the opposite position. In so doing, the motor is momentarily deenergized, and the relay coil 15 is disconnected from the line, so that the relay 14 returns to its non-actuated position and recloses the contacts 16 and 17 to again complete the auxiliary winding circuit. When the switch 7 closes in its opposite position, the main winding 2 is again connected to the line in the same direction as before, but the auxiliary winding 3 is connected to the line, through the relay contact 16 and capacitor 4, with its connections reversed with respect to the main winding 2, so that a strong reverse torque is produced, and the motor is rapidly decelerated to standstill, and starts to accelerate in the reverse direction. When the switch 7 closes, the auxiliary winding 3 is reversed with respect to the main winding 2 and the direction of rotation of the motor, and the voltage across the auxiliary winding is too low to actuate the relay 14, so that the relay remains in its non-actuated position. As the motor accelerates in the reverse direction, the voltage across the auxiliary winding 3 again increases, and when it has reached the predetermined value, the relay 14 picks up to disconnect the winding 3, and the operation previously described is repeated.

It will now be apparent that a single-phase motor of the capacitor-start type has been provided which is readily plugged, or reversed while running, by operation of the switch 7, and which requires a relatively small number of parts, since the auxiliary winding circuit is controlled by a single voltage relay, of more or less standard construction, together with two small resistors. It will also be noted that no centrifugal switch is required, so that the cost of the motor is relatively low, as compared to previous reversible motors, and the motor is relatively easy to manufacture, since the difficulties involved in the use of a centrifugal switch are eliminated.

A preferred embodiment of the invention has been shown and described for the purpose of illustration, but it will be obvious that various modifications may be made within the scope of the invention. Thus, the switch 7 might be replaced by a separate line switch and reversing switch, and any type of reversing switch may be used which has two operating positions and an intermediate position in which the motor windings and relay coil are disconnected from the line. The invention is not limited, therefore, to the particular arrangement described, but in its broader aspects it includes all equivalent embodiments and modifications which come within the scope of the appended claims.

I claim as my invention:

1. A self-starting, single-phase induction motor having a main primary winding and an auxiliary primary winding, means for connecting said primary windings to a single-phase supply line, said connecting means including reversing means for reversing the connections of the windings with respect to each other, relay means for controlling the circuit of said auxiliary winding, said relay means having a non-actuated position in which the auxiliary winding circuit is closed and an actuated position in which the auxiliary winding circuit is interrupted, means for energizing the relay means in response to the voltage across the auxiliary winding when the relay means is in non-actuated position, the relay means being adapted to move to actuated position when said voltage exceeds a predetermined value, and means for energizing the relay means from the line voltage through said reversing means when the relay means is in actuated position, the reversing means being adapted to deenergize the relay means upon operation of the reversing means to cause the relay means to return to non-actuated position and reclose the auxiliary winding circuit.

2. A self-starting, single-phase induction motor having a main primary winding and an auxiliary primary winding, means for connecting said primary windings to a single-phase supply line, said connecting means including reversing means for reversing the connections of the windings with respect to each other, a relay for controlling the circuit of said auxiliary winding, said relay having an operating coil and having a contact in series with the auxiliary winding, the relay having a non-actuated position in which said contact is closed to complete the circuit of the auxiliary winding and an actuated position in which the contact is open to interrupt the auxiliary winding circuit, means for connecting said operating coil to be energized in response to the voltage across the auxiliary winding when the relay is in non-actuated position, the relay being adapted to move to actuated position when said voltage exceeds a predetermined value, and other contact means for connecting the operating coil to be energized by the line voltage through said reversing means when the relay is in actuated position, the reversing means being adapted to effect deenergization of the operating coil upon operation of the reversing means to cause the relay to return to non-actuated position and reclose the auxiliary winding circuit.

3. A self-starting, single-phase induction motor having a main primary winding and an auxiliary primary winding, means for connecting said primary windings to a single-phase supply line, said connecting means including reversing means for reversing the connections of the windings with respect to each other, a relay for controlling the circuit of said auxiliary winding, said relay having a first contact in series with the auxiliary winding and a second contact, the relay also having an operating coil, the relay having a non-actuated position in which said first contact is closed to complete the circuit of the auxiliary winding and an actuated position in which the first contact is open to interrupt the auxiliary winding circuit, means for connecting said operating coil across the auxiliary winding through the first relay contact to energize the coil in response to the voltage across the auxiliary winding when the relay is in non-actuated position, the relay being adapted to move to actuated position when said voltage exceeds a predetermined value, and means including said second relay contact for connecting the operating coil to be energized by the line voltage through said reversing means when the relay is in actuated position, the reversing means being adapted to effect deenergization of the operating coil upon operation of the reversing means to cause the relay to return to non-actuated position and reclose the auxiliary winding circuit.

4. A self-starting, single-phase induction motor having a main primary winding and an auxiliary primary winding, means for connecting said primary windings to a single-phase supply line, said connecting means including reversing means for reversing the connections of the windings with respect to each other, a relay for controlling the circuit of said auxiliary winding, said relay having an operating coil and having a contact in series with the auxiliary winding, the relay having a non-actuated position in which said contact is closed to complete the circuit of the auxiliary winding and an actuated position in which the contact is open to interrupt the auxiliary winding circuit, means for connecting said operating coil to be energized in response to the voltage across the auxiliary winding when the relay is in non-actuated position, the relay being adapted to move to actuated position when said voltage exceeds a predetermined value, means for increasing the voltage across the operating coil as soon as the relay starts its movement, and other contact means for connecting the operating coil to be energized by the line voltage through said reversing means when the relay is in actuated position, the reversing means being adapted to effect deenergization of the operating coil upon operation of the reversing means to cause the relay to return to non-actuated position and reclose the auxiliary winding circuit.

5. A self-starting, single-phase induction motor having a main primary winding and an auxiliary primary winding, means for connecting said primary windings to a single-phase supply line, said connecting means including reversing means for reversing the connections of the windings with respect to each other, a relay for controlling the circuit of said auxiliary winding, said relay having a first contact in series with the auxiliary winding and a second contact, the relay also having an operating coil, the relay having a non-actuated position in which said first contact is closed to complete the circuit of the auxiliary winding and an actuated position in which the first contact is open to interrupt the auxiliary winding circuit, a first resistor in series with said operating coil, said first resistor and operating coil being connected across the auxiliary winding through the first relay contact to energize the coil in response to the voltage across the auxiliary winding when the relay is in non-actuated position, a second resistor connected in parallel with the operating coil by said second relay contact in the non-actuated position of the relay, the relay being adapted to move to actuated position when the auxiliary winding voltage exceeds a predetermined value, the second relay contact being adapted to disconnect said second resistor as soon as the relay starts its movement to increase the voltage across the operating coil, and means including the second relay contact for connecting the operating coil to be energized by the line voltage through said reversing means when the relay is in actuated position, the reversing means being adapted to effect deenergization of the operating coil upon operation of the reversing means to cause the relay to return to non-actuated position and reclose the auxiliary winding circuit.

6. A self-starting single-phase induction motor having a main primary winding and a physically displaced auxiliary primary winding, a capacitor connected in series with the auxiliary winding, means for connecting said windings to a single-phase supply line, said connecting means including reversing switch means for reversing the connections of the windings with respect to each other, said reversing switch means having two operating positions and an intermediate position in which the windings are at least momentarily disconnected from the line, a relay for controlling the circuit of said auxiliary winding, said relay having first and second contacts and an operating coil, the relay having an actuated position and a non-actuated position, said first relay contact being connected in the auxiliary winding circuit and being closed when the relay is in non-actuated position, means for connecting said operating coil across the auxiliary winding through the first relay contact when the relay is in non-actuated position, the relay being adapted to move to actuated position and open the first contact to interrupt the auxiliary winding circuit when the voltage across the auxiliary winding exceeds a predetermined value, said second contact being connected to complete a circuit when the relay is in actuated position for connecting the operating coil across the line voltage to maintain the relay in actuated position, said circuit including the reversing switch means, whereby operation of the reversing switch means through its intermediate position deenergizes the operating coil and causes the relay to return to non-actuated position.

7. A self-starting, single-phase induction motor having a main primary winding and a physically displaced auxiliary primary winding, a capacitor connected in series with the auxiliary winding, means for connecting said windings to a single-phase supply line, said connecting means including reversing switch means for reversing the connections of the windings with respect to each other, said reversing switch means having two operating positions and an intermediate position in which the windings are at least momentarily disconnected from the line, a relay for controlling the circuit of said auxiliary winding, said relay having first and second contacts and an operating coil, the relay having an actuated position and a non-actuated position, said first relay contact being connected in the auxiliary winding circuit and being closed when the relay is in non-actuated position, means for connecting said operating coil across the auxiliary winding through the first relay contact when the relay is in non-actuated position, the relay being adapted to move to actuated position and open the first contact to interrupt the auxiliary winding circuit when the voltage across the auxiliary winding exceeds a predetermined value, a resistor and means for connecting said resistor across the capacitor when the relay is in actuated position, said second contact being connected to complete a circuit when the relay is in actuated position for connecting the operating coil across the line voltage to maintain the relay in actuated position, said circuit including the reversing switch means, whereby operation of the reversing switch means through its intermediate position deenergizes the operating coil and causes the relay to return to non-actuated position.

8. A self-starting, single-phase induction motor having a main primary winding and a physically displaced auxiliary primary winding, a capacitor connected in series with the auxiliary winding, means for connecting said windings to a single-phase supply line, said connecting means including reversing switch means for reversing the connections of the windings with respect to each other, said reversing switch means having two operating positions and an intermediate position in which the windings are at least momentarily disconnected from the line, a relay for controlling the circuit of said auxiliary winding, said relay having first and second contacts and an operating coil, the relay having an actuated position and a non-actuated position, said first relay contact being connected in the auxiliary winding circuit and being closed when the relay is in non-actuated position, means for connecting said operating coil across the auxiliary winding through the first relay contact when the relay is in non-actuated position, the relay being adapted to move to actuated position and open the first contact to interrupt the auxiliary winding circuit when the voltage across the auxiliary winding exceeds a predetermined value, means for increasing the voltage across the operating coil as soon as the relay starts its movement, means for short-circuiting said capacitor when the relay is in actuated position, said second contact being connected to complete a circuit when the relay is in actuated position for connecting the operating coil across the line voltage to maintain the relay in actuated position, said circuit including the reversing switch means, whereby operation of the reversing switch means through its intermediate position deenergizes the operating coil and causes the relay to return to non-actuated position.

9. A self-starting, single-phase induction motor having a main primary winding and a physically displaced auxiliary primary winding, a capacitor connected in series with the auxiliary winding, means for connecting said windings to a single-phase supply line, said connecting means including reversing switch means for reversing the connections of the windings with respect to each other, said reversing switch means having two operation positions and an intermediate position in which the windings are at least momentarily disconnected from the line, a relay for controlling the circuit of said auxiliary winding, said relay having first and second contacts and an operating coil, the relay having an actuated position and a non-actuated position, said first relay contact being connected in the auxiliary winding circuit and being closed when the relay is in non-actuated position, a first resistor, means for connecting said first resistor and said operating coil in series across the auxiliary winding through the first relay contact when the relay is in non-actuated position, a second resistor, means for connecting said second resistor across the operating coil when the relay is in non-actuated position, the relay being adapted to move to actuated position and open the first contact to interrupt the auxiliary winding circuit when the voltage across the auxiliary winding exceeds a predetermined value, means for disconnecting the second resistor from the operating coil as soon as the relay starts its movement to increase the voltage across the operating coil, and means for connecting the first resistor across the capacitor when the relay is in actuated position, said second contact being connected to complete a circuit when the relay is in actuated position for connecting the operating coil across the line voltage to maintain the relay in actuated position, said circuit including the reversing switch means, whereby operation of the reversing switch means through its intermediate position deenergizes the operating coil and causes the relay to return to non-actuated position.

10. A self-starting, single-phase induction motor having a main primary winding and a physically displaced auxiliary primary winding, a capacitor connected in series with the auxiliary winding, means for connecting said windings to a single-phase supply line, said connecting means including reversing switch means for reversing the connections of the windings with respect to each other, said reversing switch means having two operating positions and an intermediate position in which the windings are at least momentarily disconnected from the line, a relay for controlling the circuit of said auxiliary winding, said relay having first and second contacts and an operating coil, the relay having an actuated position and a non-actuated position, said first relay contact being connected in the auxiliary winding circuit and being closed when the relay is in non-actuated position, a first resistor, means for connecting said first resistor and said operating coil in series across the auxiliary winding through the first relay contact when the relay is in non-actuated position, a second resistor, means for connecting said second resistor across the operating coil through the second relay contact when the relay is in non-actuated position, the relay being adapted to move to actuated position and open the first contact to interrupt the auxiliary winding circuit when the voltage across the auxiliary winding exceeds a predetermined value, the second relay contact being adapted to disconnect the second resistor from the operating coil as soon as the relay starts its movement to increase the voltage across the coil, the second contact being connected to connect the first resistor across the capacitor when the relay is in actuated position, and the second contact also being connected to complete a circuit when the relay is in actuated position for connecting the operating coil across the line voltage to maintain the relay in actuated position, said circuit including the reversing switch means, whereby operation of the reversing switch means through its intermediate position deenergizes the operating coil and causes the relay to return to non-actuated position.

OMAR C. WALLEY.